United States Patent
Tung et al.

(10) Patent No.: US 10,846,071 B2
(45) Date of Patent: Nov. 24, 2020

(54) DATA MODEL API FOR LIVE APPLICATIONS IN A CLOUD COLLABORATION PLATFORM

(71) Applicant: salesforce.com, inc., San Francisco, CA (US)

(72) Inventors: Julie Tung, Los Altos, CA (US); Rajeev Nayak, San Francisco, CA (US); Kevin Gibbs, San Francisco, CA (US); Bret Taylor, Lafayette, CA (US); Yang Su, San Francisco, CA (US); Nate Botwick, San Francisco, CA (US); Pedram Razavi, San Francisco, CA (US); Scott Goodfriend, Berkeley, CA (US); Patrick Linehan, San Francisco, CA (US); Lindsey Simon, San Francisco, CA (US); Shrey Banga, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 41 days.

(21) Appl. No.: 16/264,084

(22) Filed: Jan. 31, 2019

(65) Prior Publication Data
US 2020/0133742 A1 Apr. 30, 2020

Related U.S. Application Data

(60) Provisional application No. 62/751,074, filed on Oct. 26, 2018, provisional application No. 62/751,058, filed on Oct. 26, 2018.

(51) Int. Cl.
*G06F 8/60* (2018.01)
*G06F 8/71* (2018.01)
(Continued)

(52) U.S. Cl.
CPC .............. *G06F 8/60* (2013.01); *G06F 8/34* (2013.01); *G06F 8/36* (2013.01); *G06F 8/71* (2013.01); *G06F 9/451* (2018.02); *G06F 9/5072* (2013.01); *G06F 9/5077* (2013.01); *G06F 9/54* (2013.01); *G06F 12/0871* (2013.01); *G06F 16/172* (2019.01); *G06F 16/1734* (2019.01); *G06F 16/1774* (2019.01); *G06F 16/252* (2019.01); *G06F 16/901* (2019.01); *G06F 16/93* (2019.01); *G06F 21/31* (2013.01); *G06F 21/53* (2013.01); *G06F 21/563* (2013.01);
(Continued)

(58) Field of Classification Search
None
See application file for complete search history.

(56) References Cited

U.S. PATENT DOCUMENTS

| | | |
|---|---|---|
| 2015/0261971 A1* | 9/2015 | McFerrin |
| 2018/0218006 A1* | 8/2018 | Palmer |
| 2018/0373501 A1* | 12/2018 | Li |

* cited by examiner

*Primary Examiner* — Syed A Roni
(74) *Attorney, Agent, or Firm* — Sterne, Kessler, Goldstein & Fox P.L.L.C.

(57) ABSTRACT

Disclosed herein are system, method, and computer program product embodiments for providing a data model application programming interface to customizable live applications in a cloud collaboration platform. The cloud collaboration platform allows third-party live applications to securely create, store, and access data within the cloud collaboration platform. The data model allows records stored in the cloud collaboration platform to sync independently, merge intelligently, and function offline.

20 Claims, 6 Drawing Sheets

(51) Int. Cl.
*G06F 9/451* (2018.01)
*G06F 8/34* (2018.01)
*G06F 21/31* (2013.01)
*G06F 9/50* (2006.01)
*G06F 21/56* (2013.01)
*G06F 8/36* (2018.01)
*G06F 16/901* (2019.01)
*G06F 9/54* (2006.01)
*G06F 12/0871* (2016.01)
*G06F 21/53* (2013.01)
*H04L 29/06* (2006.01)
*H04L 29/08* (2006.01)
*G06F 16/176* (2019.01)
*G06F 40/166* (2020.01)
*G06F 16/93* (2019.01)
*G06F 16/172* (2019.01)
*G06F 16/17* (2019.01)
*G06F 16/25* (2019.01)

(52) U.S. Cl.
CPC ............ *G06F 40/166* (2020.01); *H04L 63/10* (2013.01); *H04L 63/20* (2013.01); *H04L 65/4015* (2013.01); *H04L 67/34* (2013.01)

DATA MODEL API FOR LIVE APPLICATIONS IN A CLOUD COLLABORATION PLATFORM

CROSS-REFERENCE TO RELATED APPLICATIONS

This application claims the benefit of U.S. Provisional Patent Application 62/751,074, by Tung, et al., "Integrating Customizable Live Applications Into A Cloud Collaboration Platform," filed Oct. 26, 2018, and U.S. Provisional Patent Application 62/751,058, by Tung, et al., "Embedding Prefabricated Live Applications Into A Cloud Collaboration Platform," filed Oct. 26, 2018, which are hereby incorporated by reference in their entirety.

This application is related to U.S. patent application Ser. No. 16/254,051 titled "Developer Experience For Live Applications In A Cloud Collaboration Platform," filed herewith, U.S. patent application Ser. No. 16/264,077 titled "Offline Capabilities For Live Applications In A Cloud Collaboration Platform," filed herewith, U.S. patent application Ser. No. 16/264,068 titled "Security Model For Live Applications In A Cloud Collaboration Platform," filed herewith, and U.S. patent application Ser. No. 16/264,058 titled "Rich Text Box For Live Applications In A Cloud Collaboration Platform," filed herewith, all of which are herein incorporated by reference in their entireties.

BACKGROUND

A cloud collaboration platform may allow users to author various forms of content, for example, text files, spreadsheets, presentation slides, and other documents. The cloud collaboration platform may furnish a litany of word processing tools to authors to create and revise the documents. An author may also communicate with other users on the cloud collaboration platform, share documents, and receive comments, suggestions, edits, and other feedback. By integrating communication tools with word processor tools, a cloud collaboration platform may enhance workflows, save time, and promote teamwork and user satisfaction.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
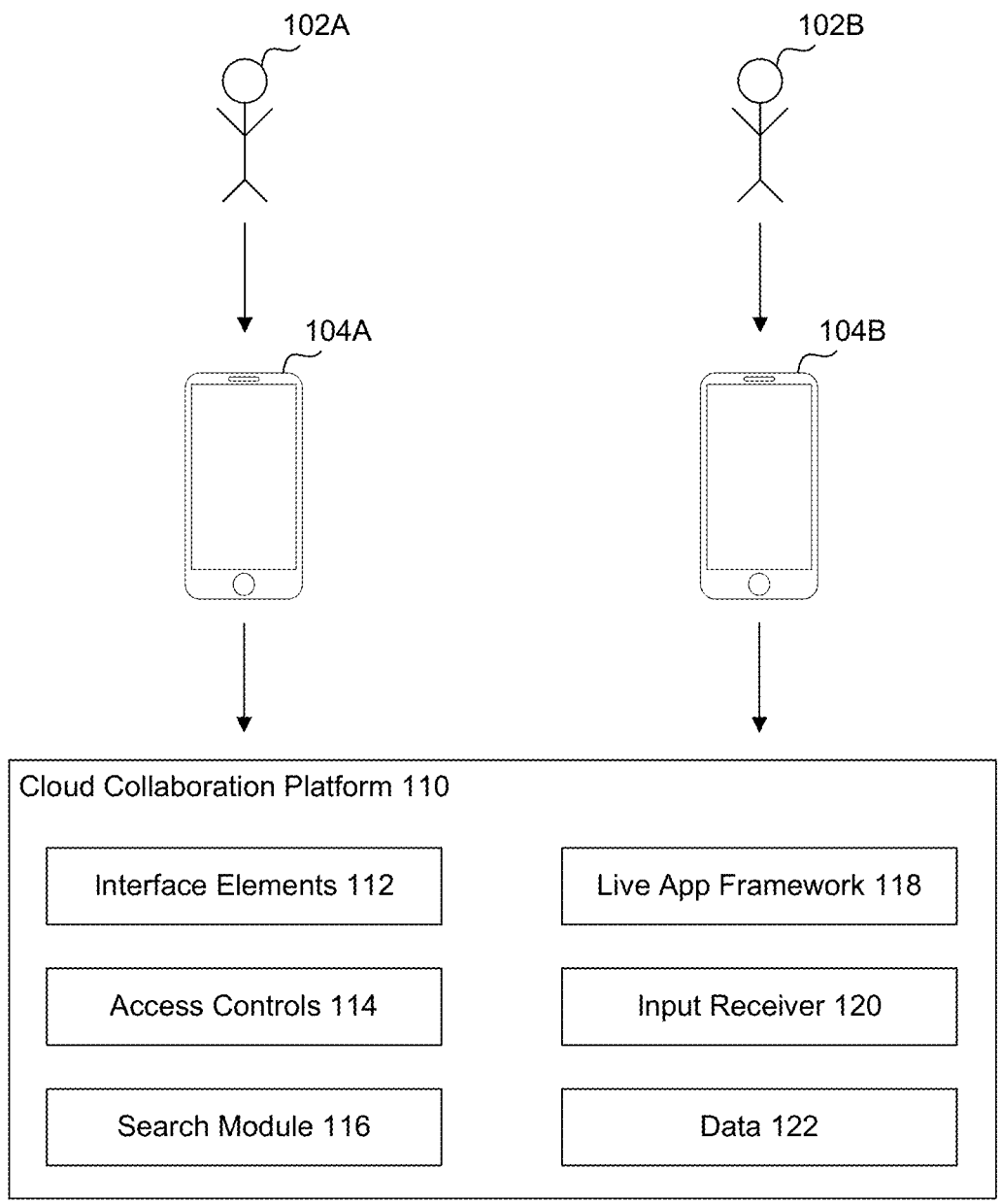
FIG. 1 is a schematic block diagram showing an example environment including a cloud collaboration platform, according to some embodiments.

Provided herein are system, apparatus, device, method and/or computer program product embodiments, and/or combinations and sub-combinations thereof, for providing a data model to customizable live applications in a cloud collaboration platform.

A cloud collaboration platform may allow multiple users to work together to design, write, implement, edit, and finalize various forms of content. Such content may be text files, spreadsheets, presentation slides, videos, audio files, and other suitable documents. A cloud collaboration platform may include word processing tools that allow users to create, compose, draft, and revise these documents. A cloud collaboration platform may include a versioning system to dynamically track changes made to documents over time.

A cloud collaboration platform may encourage collaboration among users by allowing users to send other users messages, include comments in or on documents, post to message boards, solicit feedback, and engage in other suitable communications. Some comments in a cloud collaboration platform may be viewable by all users while other comments may be user-specific and only viewable by one user or a subset of the users. Comments may tag, link, @mention, or otherwise reference other users, documents, and materials. Users may also post feedback stickers, i.e., prompts via which users can receive information from other users, conduct polls, receive text answers to questions, etc.

A cloud collaboration platform may incorporate permissions, configurations, and access controls. For example, a cloud collaboration platform may allow users to set access permissions to documents. In an embodiment, a document's author may control whether other users may edit or view the document, comment on the document, share the document, delete the document, etc. An author may set access permissions on a per-user, i.e., grant access to only one user or a subset of users, and/or a per-document basis, i.e., configure a different set of access permissions for each file in the cloud collaboration platform.

A cloud collaboration platform may be enhanced by supporting interactive, embeddable, customizable software applications, herein referred to as live applications, within the cloud collaboration platform. A user may insert live applications into a document to access any programmed behaviors. Live applications may be inlayed in the documents in the cloud collaboration platform using an inline frame, section, or other Hypertext Markup Language HTML construct.

A live application may be a first-party application developed by and provisioned within the cloud collaboration platform as a standardized and readily deployable live application. Examples of first-party live applications may include: project trackers, calendars, Kanban boards, checklists, countdowns, and polls. A user may insert a first-party live application within documents in the cloud collaboration platform to easily access the preconfigured functionalities furnished by the cloud collaboration platform. Organizations may configure which first-party live applications may be embedded in documents.

However, a live application may also be developed by a third party, i.e., by the organization, to further customize and extend the canvas of the cloud collaboration platform to meet unique requirements and organizational needs. In developing, deploying, and maintaining a third-party live application, an organization may leverage an extensible application program interface (API), a data model, and development framework provided by the cloud collaboration platform. Thus, developers may design, write, customize, and maintain live applications to address unique use cases, and the cloud collaboration platform may provide the tools to safely, securely, and promptly deploy the third-party live applications. Customizable live applications may connect with external tools, for example, data lakes, data repositories, databases, other cloud systems, application servers, etc. The cloud collaboration platform may support secure interactions with external systems through an authorization framework, e.g., OAuth, Security Assertion Markup Language (SAML), etc.

Given the panoply of potential use cases addressed with third-party applications, a cloud collaboration platform faces security and logistical concerns with respect to the storage and provision of data. If a cloud collaboration platform requires third-party live applications to store data on the organization's own servers, the cost, responsibility, and risk of storage is offloaded to the organizations, which can frustrate the rapid development and deployment of live applications. Small organizations with smaller-scale live application scenarios may not be able to develop a live application at all if data storage is not provided.

However, providing access to data stored within the cloud collaboration platform presents additional security risks and data concerns. For example, a third-party live application should not have access to data from other customers, detailed information about users in the cloud collaboration platform, or access to the underlying functions and data that support document creation in the cloud collaboration platform generally. Thus, the data and endpoints exposed to a third-party live application needs to be narrowly tailored to avoid overexposure of data and other system resources.

Accordingly, a need exists to provide data storage within a cloud collaboration platform to live applications in accordance with a data model that supports the creation, storage, retrieval, and modification of records in the cloud collaboration platform.

FIG. 1 is a schematic block diagram showing an example environment 100 including a cloud collaboration platform, according to some embodiments. Environment 100 may include users 102, such as users 102A and 102B, devices 104, such as devices 104A and 104B, and cloud collaboration platform 110.

Users 102 may be individuals or entities developing documents on a cloud collaboration platform. Users 102 may members of a business, organization, or other suitable group using the cloud collaboration platform to perform tasks related to that business or organization. Or users 102 may be individuals using a cloud collaboration platform for personal pursuits. Users 102 may be human beings, but users 102 may also be artificial intelligence constructs. Users 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Devices 104 may be personal digital assistants, desktop workstations, laptops or notebook computers, netbooks, tablets, smart phones, mobile phones, smart watches or other wearables, appliances, part of the Internet-of-Things, and/or embedded systems, to name a few non-limiting examples, or any combination thereof. Although devices 104 are illustrated in the example of FIG. 1 as a single computer, one skilled in the art(s) will understand that devices 104 may represent two or more computers in communication with one another. Therefore, it will also be appreciated that any two or more components of environment 100 may similarly be executed using some or all of the two or more computers in communication with one another.

Cloud collaboration platform 110 may combine word processing tools with communication tools to enhance teamwork and collaboration among multiple users in building, editing, and finalizing text files, documents, spreadsheets, presentation slides, and other files. Cloud collaboration platform 110 may include interface elements 112, access controls 114, search module 116, live application framework 118, input receiver 120, and data 122.

Cloud collaboration platform 110 may provide organizations with the capability to develop customized, third-party live applications and integrate the live applications into cloud collaboration platform 110. Cloud collaboration platform 110 may provision an extensible application program interface (API), a data model, and development framework to the third parties to allow developers for the third party to design, write, customize, and maintain the live applications. A data model may specify the appropriate format for requesting and modifying data used by the live applications.

Interface elements 112 may provide components that allow cloud collaboration platform 110 to render a user interface for users 102 to view on devices 104. Interface elements 112 may include a JavaScript library or other user interface library to facilitate dynamic interactions between users 102 and cloud collaboration platform 110. Interface elements 112 may include a development toolkit facilitating the building and deployment of HTML5 applications or mobile applications. Interface elements 112 may include appropriate stylesheets and design formats to shape, for example, the display format of data retrieved by cloud collaboration platform 110.

Access controls 114 may control permissions and user access within cloud collaboration platform 110. Access controls 114 may authorize connections to cloud collaboration platform 110 using username/password combinations. In some embodiments, access controls 114 may employ an alternate authentication methodology, such as two-factor authentication, token authentication, biometric data, etc., to identify, authorize, encrypt, and account for user connections. The level of access granted to a user may vary depending on the user type; therefore, the functionality provided to users may differ depending on the individual user accessing the system. Access controls 114 may additionally track access to documents among users 102. For example, access controls 114 may store information indicating that a particular user may access a particular document and an access level. Access controls 114 may further store information about external data sources, for example, OAuth or SAML parameters to be used when interacting with external data systems.

Search module 116 may allow users 102 to search for other users, documents, files, or data items within cloud collaboration platform 110. Search module 116 may employ a suitable search tool or indicator to receive an input from users 102. Search module 116 may use an appropriate cataloging methodology to store previous messages, comments, edits, etc. and retrieve appropriate information via full-text searches. Search module 116 may promote the use of "@" or "#" to retrieve appropriate documents, users, or live applications that satisfy the searches from users 102. In an embodiment, search module 116 may retrieve live applications by a configured name. For example, users 102 may insert a live application named "My Tasklist" into a document by entering "@My Tasklist." In an embodiment, search module 116 may retrieve a list of applications satisfying an entered substring, i.e., in the above example search module 116 may display the "My Tasklist" live application when users 102 enter "My T" or other suitable substring.

Live application framework 118 may allow an organization to develop customizable live applications, to integrate the applications into cloud collaboration platform 110, and embed the applications in documents. Live application framework 118 may employ a data API through which developers with organizations may interact with data used by the live application and stored within cloud collaboration platform 110. Live application framework 118 may use a data model that conceptualizes the layout of data for records stored in the system. Live application framework 118 may support the extension of standard functionalities and interface components, i.e., building blocks, within cloud collaboration platform 110, for example, comments, mentions, and references. Live application framework 118 may allow customized live applications to function while in offline mode. Live application framework 118 may further provide a versioning system to allow developers to specify which APIs their live application should run against, to avoid breaking the behavior of deployed customizable live applications with the release of subsequent updates to live application framework 118. Live application framework 118 may support the bundling of live applications into packages to organize the deployment of applications. Live application framework 118 may analyze customized live applications to ensure that the applications adhere to security requirements or provide a means by which an organization may verify that the developed application adhere to and meet security requirements. Live application framework 118 is described in further detail below with reference to FIG. 2.

Input receiver 120 may receive and process inputs from users 102 within cloud collaboration platform 110. Input receiver 120 may receive inputs from any suitable mechanism including: a mouse, a keyboard, stylus, input gesture, or other suitable mechanism for expressing a user intentions. Input receiver 120 may receive the inputs from users 102 via devices 104. User inputs may include entering text, drawing checkmarks, circles, squares, lines, and other geographic symbols, swiping, clicking, tapping, dragging, and other gestures. Input receiver may use interface elements 112 to display appropriate navigational buttons, input forms, and other HTML fields to facilitate interaction with cloud collaboration platform 110.

Data 122 may be a variety of stored information relevant to the documents, messages, comments, live applications, and other information in cloud collaboration platform 110. Data 122 may be housed or stored in a relational database, a NoSQL database or other horizontally scaling database, a digital ledger technology or blockchain, or any other suitable storage mechanism. For instance, cloud collaboration platform 110 may harness any commercially available database management system to store and retrieve data 122. Sufficient storage may alternatively exist in any other physically attached magnetic storage, cloud storage, or additional storage medium. In an embodiment, cloud collaboration platform 110 deploys a hard-disk interface or fibre for interfacing with storage mediums housing data 122.

Figure 2:
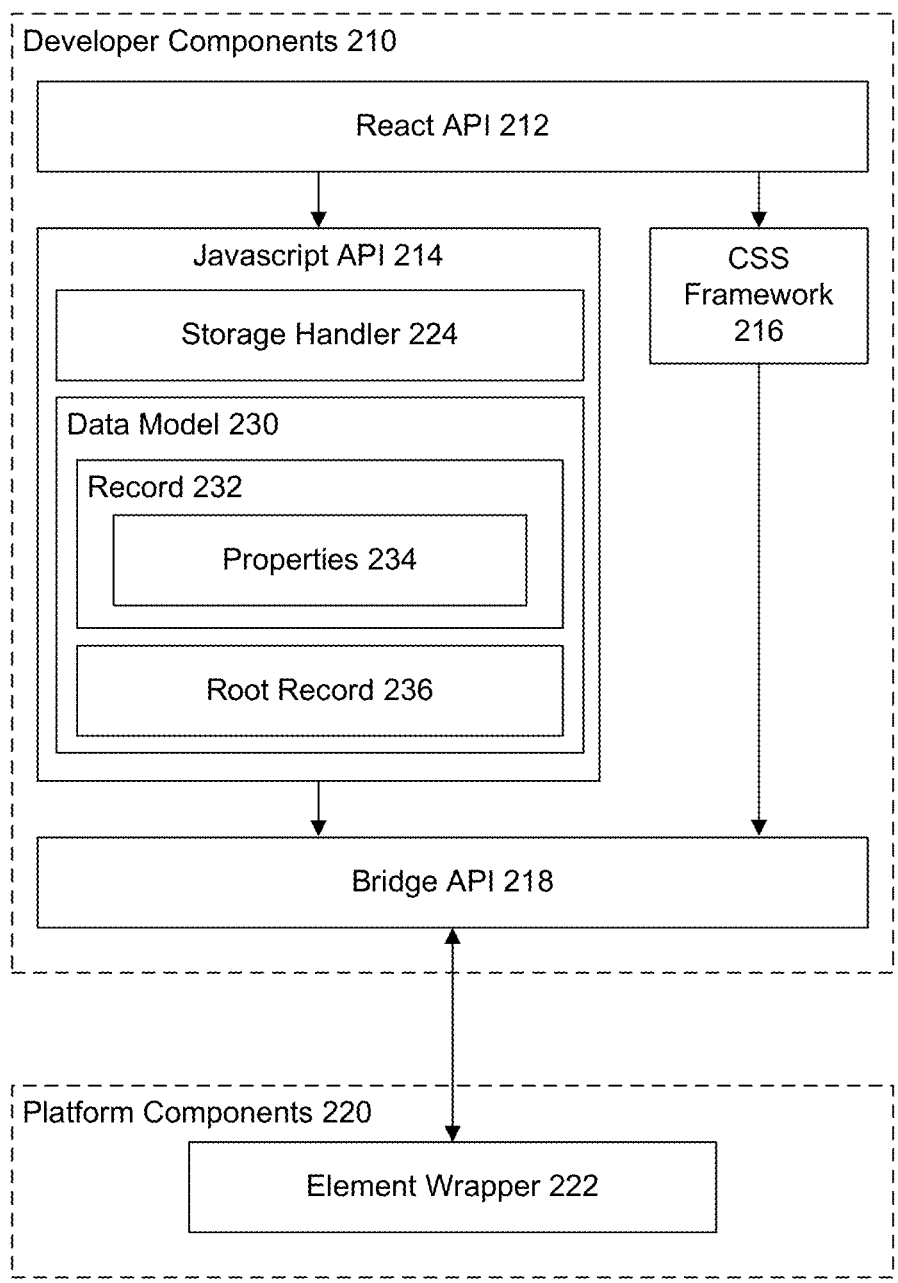
FIG. 2 is a schematic block diagram showing a live application framework including a data model, according to some embodiments.

FIG. 2 is a schematic block diagram showing live application architecture 200, according to some embodiments. Live application architecture 200 may support and facilitate the development and deployment of third-party live applications in cloud collaboration platform 110. Live application architecture 200 may include developer components 210 and platform components 220.

Developer components 210 may be accessed by developed to program third-party live applications. Developer components 210 may include react API 212, javascript API 214, Cascading Style Sheets (CSS) framework 216, and bridge API 218.

React API 212 may be code, libraries, HTML, and components employed by cloud collaboration platform 110 to handle common considerations shared across live applications. For example, react API 212 may handle a resizing command received from users 102. React API 212 may receive commands from users 102 related to the creating, saving, and updating of data by a customizable live application. React API 212 may include Javascript API 214 and CSS framework 216 as subcomponents or these components may be independent from react API 212.

Javascript API 214 may facilitate the implementation of common operations performed in the document object model or other suitable programming interface. Javascript API 214 may receive scripting commands and execute triggers associated with the commands within cloud collaboration platform 110. Javascript API 214 may allow developers of third-party live applications to employ functionality that is standard within cloud collaboration platform 110, for example, performing a certain behavior during an on-hover event. In this example, users 102 may see further information about a user in cloud collaboration platform 110 when they hover the mouse over a user image.

CSS framework 216 may be harnessed by react API 212 to maintain a consistent visual style within cloud collaboration platform 110. CSS framework 216 may provide a utilitarian interface including static methods, properties, and specifications. CSS framework 216 may deploy appropriate styles to developers of third-party live applications to allow the live applications to adopt a look-and-feel that matches the general properties of a document in a cloud collaboration platform 110.

Bridge API 218 may coordinate communications between a live application and cloud collaboration platform 110. Bridge API 218 may define a protocol that employs protocol buffer messages or other suitable method of formatting language- and platform-neutral serialized data structures for use in communication protocols. Bridge API 218 may perform requests resultant from modifications made by a live application to the data model and thus, a live application may not call bridge API 218 directly, instead referencing intermediate APIs that call bridge API 218 to perform transactions.

Platform components 220 may include modules, functions, and other code executed on cloud collaboration platform 110 to allow third-party live applications to function. Platform components 220 may include element wrapper 222, storage handler 224, data model 230, record 232, properties 234, and root record 236.

Element wrapper 222 may wrap, embed, inlay, etc. a live application within a document for rendering in cloud collaboration platform 110. Element wrapper 222 may process and handle layout and user-interface interactions live applications and documents in cloud collaboration platform 110.

Storage handler 224 may process data initialization, storage, modification, and retrieval requests received from a live application. Storage handler 224 may provide an API to a live application to perform varied tasks against the data model. For example, storage handler 224 may receive an API call such as "getRecordById," "getRootRecord," etc.

and retrieve the appropriate set of information from data 122 based on the request. In other words, storage handler 224 may serve as an intermediate API between the data model and the live application. Storage handler 224 may communicate with bridge API 218 to complete storage-based modifications and requests.

Data model 230 may present a model that allows live applications to the request, modify, and store data. For example, a live application may access data stored in cloud collaboration platform 110 in data 122. Cloud collaboration platform 110 may expose data model 230 to store document metadata (e.g., document title, thread members, etc.), document data (e.g., spreadsheet data), data from other live applications embedded in the document, viewer-specific data (e.g., contacts, metadata for other documents that a user may access) user information, and other data related to the functioning of a live application and a document at large. Data model 230 may guarantee appropriate usage of the data API by providing functions and stored variables used by the live application to access and interact with external data.

In one embodiment, when users 102 insert a live application into a document, storage handler 224 may create an empty data field (e.g., a JSON or JSON-like object) and store the field locally within element wrapper 222. One such record initialized by default may be referred to as the root record, described in further detail below as root record 232. A third-party live application may then populate the record in accordance with the data model's requirements to save the data in the record to cloud collaboration platform 110 for further manipulation and later recall. Thus, developers may treat the storage of data into the cloud collaboration platform model the same as storing the data in a JSON object, and the record data needed by a live application may be pulled from data model 230 dynamically at runtime.

Record 232 may provide the basic unit of storage in data model 230. Record 232 may represent a discrete unit of data within an instance of a live application embedded in a document in cloud collaboration platform 110. Record 232 may represent a text field, a rich text box, an image, a blob, a user, or other discrete data units harnessed by a live application. Record 232 may also reference another record or lists of such records enabling developers to design more robust data storage approaches in a hierarchical, tree form.

In an embodiment, record 232 may be one or more key-value pairs, a reference to a second record, or a list of records. Record 232 may be one or more key-value pairs that store information used by the live application. For example, the "My Tasklist" live application may include one or more key-value pairs in root record 236. One such key-value pair may be "title-color," "green" and another key value pair may be "title-text," "My Tasklist." Cloud collaboration platform 110 may then store this information in data 122 via data model 230, retrieve the information at a later time, modify the stored information, etc. When "My Tasklist" loads, the application may load this information and display the title of the live application as "My Tasklist" in the color green. The "My Tasklist" live application may subsequently receive a color update from the user, change the stored key-value pair to "title-color," "red" via an appropriate API call (or direct modification). The next time that this instance of "My Tasklist" loads, the live application instance may retrieve the "title-color", "red" key-value pair and display the "My Tasklist" title in the color red.

Record 232 may also be a second record or a list of records also stored in association with a name field. In the "My tasklist" example, a list of records reflecting the tasks associated with the user may be stored, with each task in turn being its own record object. As described below with reference to FIG. 4, a developer may create and register classes to associate with the records, allowing more advanced functionalities.

Properties 234 allow developers to defined custom properties for records, such as record 232. This ability provides flexibility within data model 230 to store a variety of stock data types as well as developer-defined classes. In one embodiment, properties 234 may provide capabilities to store data types including: a Javascript primitive (string, number, Boolean, etc.), a javascript object or array, a record, or a list of records. Properties 234 may allow developers to make use of additional special data types, for example, a rich text property, an image property, a blob property, a binary file property, etc. In such an embodiment, cloud collaboration platform 110 may forward additional capabilities to the live application via the data model based on the special property.

Root record 236 may be a default instance of record 232 created by cloud collaboration platform 110 for each instance of a live application. Root record 236 may include a set of default characteristics that a live application may use to store and retrieve data. Root record 236 may serve as the source record for a hierarchical structure, wherein all sub-records, i.e. one or more records such as record 232, derive from root record 236 in a tree-like structure.

Figure 3:
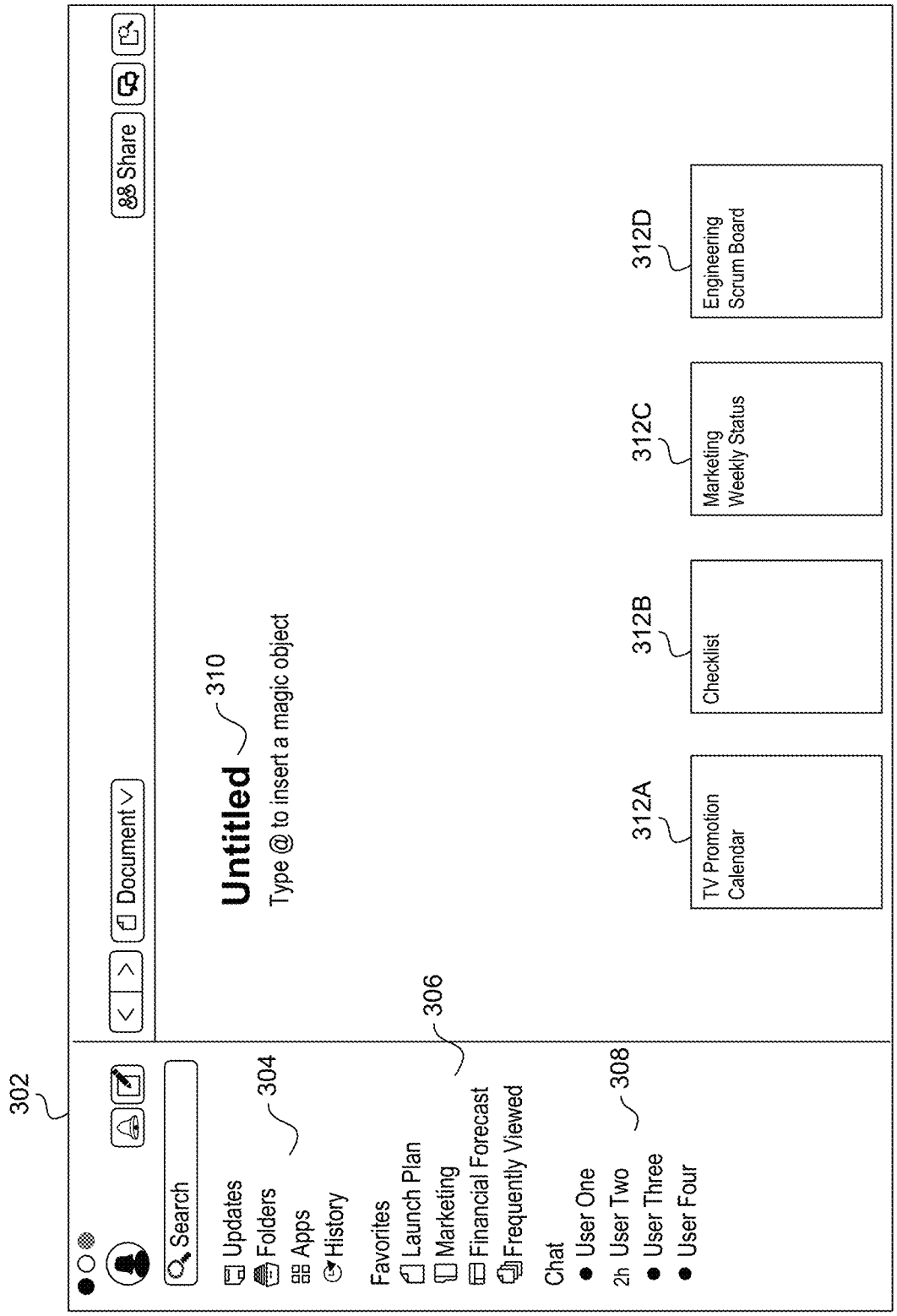
FIG. 3 is an example screen display of a document incorporating live applications in a cloud collaboration platform, according to some embodiments.

FIG. 3 is an example screen display 300 of a document incorporating live applications in a cloud collaboration platform, according to some embodiments. The screen display provided in FIG. 3 is merely exemplary, and one skilled in the relevant art(s) will appreciate that many approaches may be taken to provide a suitable screen display 300 in accordance with this disclosure.

Document 302 may be a document created and stored in cloud collaboration platform 110 and presented to users 102 viewing devices 104. Document 302 may be a word processing document, text file, spreadsheet, presentation slide, video or audio file, or other editable, sharable content. Document 302 may include text, language, images, videos, and other standard HTML components. Document 302 may further include live applications embedded or inserted within the body of the document to provide additional functionality. A set of building blocks may be made available in document 302, as extended and provisioned by cloud collaboration platform 110 to live applications. In an embodiment, cloud collaboration platform 110 may inlay live applications built with third-party code inside inline frames in document 302. In this embodiment, cloud collaboration platform 110 may set global attributes and event attributes in the inline frames.

Navigation panel 304 may provide users 102 with components to navigate cloud collaboration platform 110 and documents therein. In the merely exemplary embodiment portrayed in screen display 300, users 102 may click "Updates" to see a list of recent updates to documents that the user may access, "Folders" to navigate to a list of folders created by the user to store, organize, and share their documents, "Apps" to view a list of live applications to which the user may access or embed, and "History." These examples are in no way exhaustive, however, and navigation panel 304 may include other suitable navigational components or navigate to different areas of cloud collaboration platform 110.

Favorites 306 may display documents, live applications, and other content determined by cloud collaboration platform 110 to be relevant to the viewer. Cloud collaboration platform 110 may determine the content to display in favorites 306 through a suitable methodology, for example, by displaying the most recently accessed documents/resources or the most frequently accessed documents/resources. In another example, cloud collaboration platform 110 may receive a configured selection from users 102 and consider the configurations in determining the content to display in favorites 306. Favorites 306 may receive user inputs and navigate to an appropriate document or other location based on the received user inputs.

Chat 308 may provide a conversation mechanism by which a user may communicate with other users. In an embodiment, selecting a user in chat 308 may open a chat window in which the user may send a message to the selected user. The chat window may support mentions, comments, links to documents, and other core functionalities.

Prompt 310 may provide a space in which users 102 may build a document and edit the content included therein. Users 102 may enter text, images, tables, etc. In one embodiment, by entering a token, for example "@", the user may load a menu of additional content that may be embedded in the document. Such additional content may include links to other documents, mentions of other users, and live applications. For example, users 102 may click in 310 and type "My Tasklist" (the above exemplary third-party live application). Upon confirming, cloud collaboration platform 110 may insert the "My Tasklist" application into the document. The "My Tasklist" application may load data from data model 230 in the form of one or more records, i.e., record 232, and render the "My Tasklist" live application based on the retrieved data.

Selector 312 may provide an additional mechanism by which users 102 may enter live applications into document 302. Selector 312 may display the live applications configured and deployed by an organization. Selector 312 may also display live applications that are preconfigured by cloud collaboration platform 110 to display. Selector 312 may further allow a user to configure the displaying live applications, for example, by removing a live application or adding an additional live application.

Figure 4:
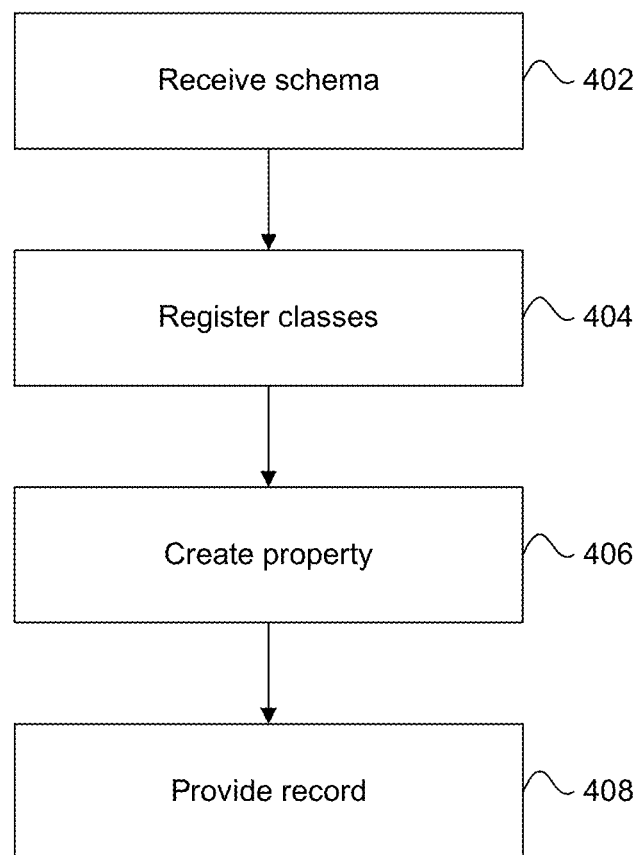
FIG. 4 is a flowchart illustrating a method of processing data requests from a live application in a cloud collaboration platform, according to some embodiments.

FIG. 4 is a flowchart illustrating a method 400 of processing data requests from a live application in a cloud collaboration platform, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, cloud collaboration platform 110 may employ storage handler 224 to receive schema, specifications, or other definitions. Cloud collaboration platform 110 may register a record, such as record 232, based on the received data schema. In an embodiment, a schema may define the record name and the record type. In an embodiment, the type may be a simple data type, i.e. a primitive, such as string, Boolean, object, array, etc. Or the type may be a special type such as a constructor, rich text entity, image entity, a record, or a record list. Or the type may be a custom defined type. An example of such a received schema may be:

```
ExampleSchema: {
    "header": CardEntity,
    "color": "string"
}
```

In an example, storage handler 226 may receive the schema and a record to include the properties exhibited by the received schema.

In 404, cloud collaboration platform 110 may register classes defined in the schema received in 402. Cloud collaboration platform 110 may serialize properties in the classes into a JSON field. By registering these classes in accordance with the received schema, cloud collaboration platform 110 may provide further detail, e.g., the data stored in the records, about the registered data entity in subsequent calls. In one embodiment, registered-class information may be provided when a call to "getRootRecord( )" or "getRecord( )" is received from a live application.

In 406, cloud collaboration platform 110 may insert a live application in a document, such as document 302 while including the classes registered in 404 in the created inline frame. Cloud collaboration platform 110 may employ an initialization routine or other appropriate method to create the properties for records included in the live application. The created properties, i.e., properties 234, may be a javascript primitive (string, number, Boolean, etc.), or a link to another record or a list of records. In one embodiment, the property may specify a special class of data type provided by cloud collaboration platform 110, for example a binary data type or blob data type. A record with such a data type may provide additional characteristics for unique handling by cloud collaboration platform 110. One skilled in the relevant arts will understand that this data model allows developers to build a tree-like, hierarchical structure via the data model that represents a panoply of data scenarios and allows the user to store more complicated data usage scenarios via data model 230. For example, cloud collaboration platform 110 may receive a call from a customizable live application to "rootRecord.set(param1, param2)". In this embodiment, "param1" may be the name of the property, and "param2" may be an object containing child properties to set on the newly created record. If no special properties or child properties are to be set, then "param2" may be a null or empty object. Cloud collaboration platform 110 may create the property when the live application is created, and cloud collaboration platform 110 may not need to recreate the object during subsequent loads of the document.

In 408, cloud collaboration platform 110 may provide the record to the live application upon request. In one embodiment, a live application may call "rootRecord.get(param1)" to access the stored entity. A live application may call appropriate modifying functions to update, edit, and add to records stored via the inline frame.

Figure 5:
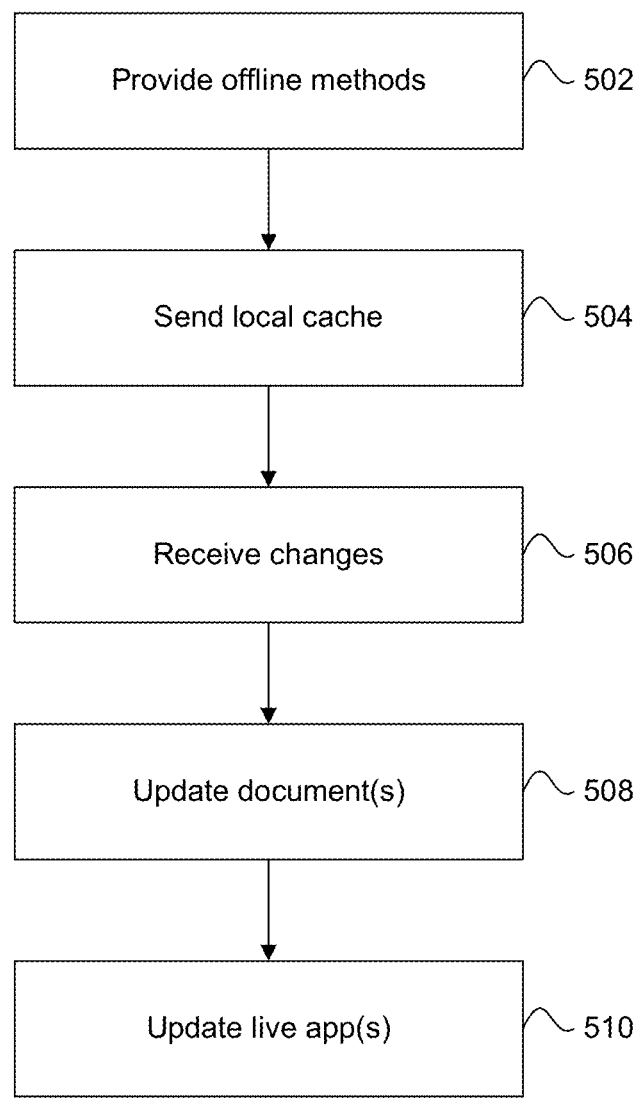
FIG. 5 is a flowchart illustrating a method of providing a framework to live applications embedded in documents to function while offline, according to some embodiments.

FIG. 5 is a flowchart illustrating a method 500 of providing a framework to live applications embedded in documents allowing the live applications to function while offline, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, cloud collaboration platform 110 may send modules, executables, applications, and other components to support an offline mode to devices 104 when users 102 install tools needed to run cloud collaboration platform 110 or at another suitable time. In an offline mode, cloud collaboration platform 110 may continue to offer customary functionalities despite the fact that devices 104 may not be able to access cloud collaboration platform 110, for example, due to a lack of network connectivity. In an offline mode, users 102 may continue to make and affect changes to their documents in cloud collaboration platform 110 because devices 104 store a local cache of data to retrieve needed data from and temporarily store modifications. When users 102 make changes to the offline document, devices 104 may store the changes in the local cache. For example, a user may change the completed date for a task displayed in the "My Tasklist" live application while the device is offline, and the local cache may store this completed date.

In 504, devices 104 may return to online mode, and a device may transmit the local cache of changes that occurred while the device was offline to cloud collaboration platform 110 to synchronize the changes with the online version.

In 506, cloud collaboration platform 110 may receive the changes sent in 504. Cloud collaboration platform 110 may receive the changes in any suitable format, for example, in JSON or other data interchange format, as transaction logs, as executable code, or using any other suitable manner. Cloud collaboration platform 110 may store changes in data 122, in memory, or in a local cache for processing.

In 508, cloud collaboration platform 110 may update a document or documents in the platform based on the changes received in 506. In an embodiment, cloud collaboration platform 110 may apply the changes into the document even if another user is editing the document at the same time. In an embodiment, if multiple edits occur to the offline-edited section, cloud collaboration platform 110 may apply both edits to the document sequentially, i.e., both edited versions may display, one after the other. In an alternate embodiment, cloud collaboration platform 110 may apply a conflict resolution methodology to address conflicting edits made to a document. For example, a user may add a paragraph to a document while offline. When the user's device returns to an online mode, cloud collaboration platform 110 may add the paragraph to the online version of the document so that other users working on cloud collaboration platform 110 may view and further edit the paragraph.

In 510, cloud collaboration platform 110 may update live applications as indicated in the changes received in 504. In an embodiment, cloud collaboration platform 110 may apply the change to the live application even if another user is editing the document at the same time. Cloud collaboration platform 110 may provide suitable data APIs and other supporting APIs to allow the developers to pass the offline stored information to cloud collaboration platform 110. In an alternate embodiment, cloud collaboration platform 110 may retrieve customizable live application updates automatically based on a naming convention, exposed objects, parameters, and/or other descriptive information. For example, a third party application may display a calendar in a document while offline. A user may add an entry to the calendar while offline. Upon returning to online mode, cloud collaboration platform 110 may synchronize the offline calendar and the online calendar by adding the added calendar entry to the online version of the calendar.

Figure 6:
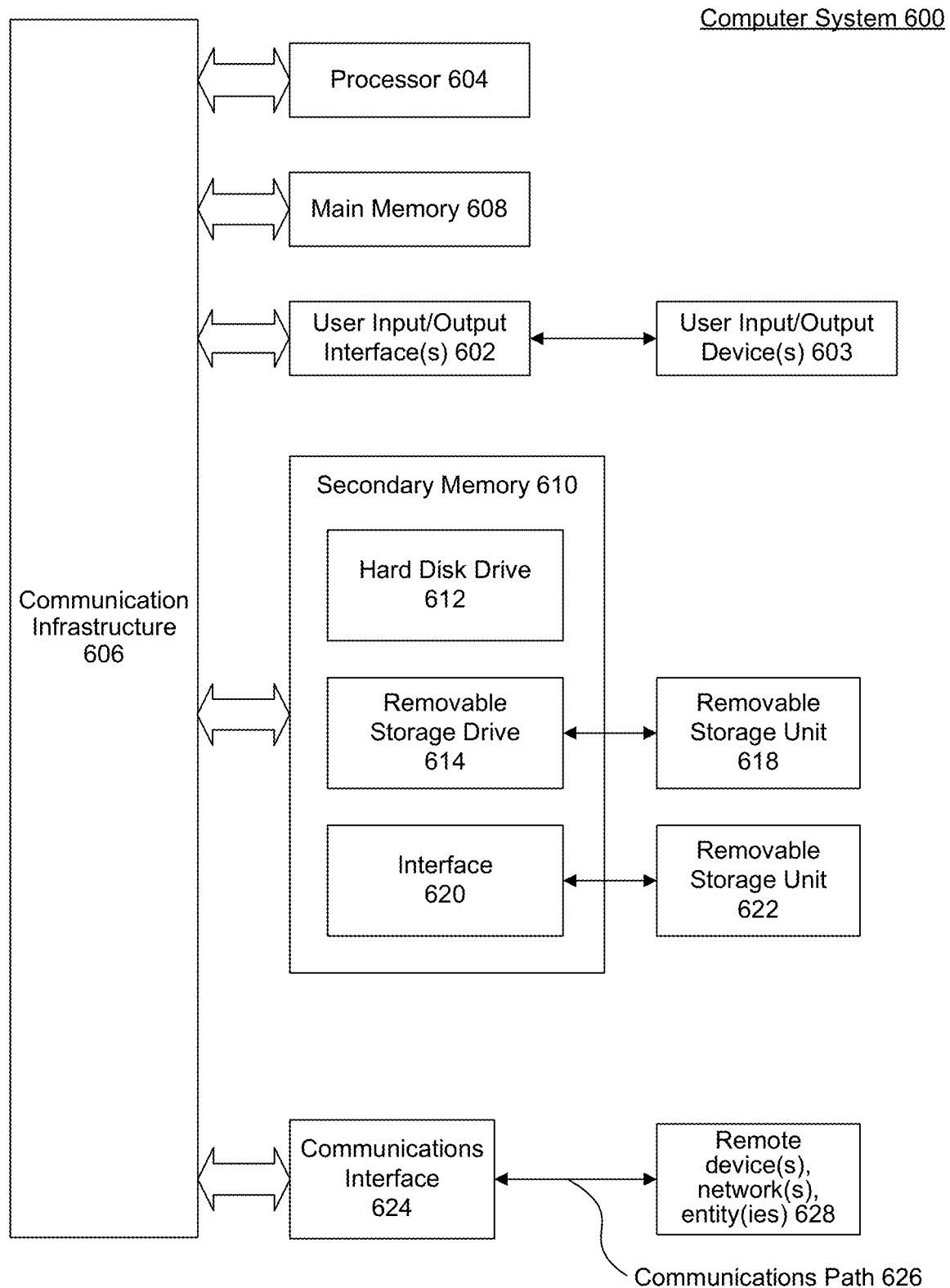
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
providing, by one or more processors, data storage and a data model application programming interface to a live application in a cloud collaboration platform;
initializing, by the one or more processors, a record in an instance of the live application running in a document in a cloud collaboration platform,
wherein the record comprises one or more properties,
wherein a property in the one or more properties is a key-value pair comprising a key and a value, and
wherein the property is associated with a data type and the cloud collaboration platform extends additional functions to the live application based on the data type;
receiving, by the cloud collaboration platform, a changed value and the key from the instance of the live application;
updating, by the one or more processors, the value in the key-value pair corresponding to the key to reflect the changed value; and
storing, by the one or more processors, the updated key-value pair in the data storage in association with the instance of the live application.

2. The method of claim 1, further comprising:
receiving, by the one or more processors, a request key and a get request from an instance of the live application;

retrieving, by the one or more processors, the value from the data storage, wherein the key associated with the value via the key-value pair matches the request key; and providing, by the one or more processors, the value to the instance of the live application.

3. The method of claim 1, wherein the value is a second record.

4. The method of claim 1, wherein the value is a list of records.

5. The method of claim 1, further comprising:

providing, by the one or more processors, offline functions to a device accessing the cloud collaboration platform to allow the device to create a local cache of the data storage to allow the live application to continue to function when the device is offline.

6. The method of claim 1, wherein the data type indicates the property is a binary file, and wherein the additional functions support embedding of a binary file in the instance of the live application.

7. The method of claim 1, wherein the data type indicates the property is an account in the cloud collaboration platform, and wherein the additional functions support embedding of a user account in the instance of the live application.

8. The method of claim 1, wherein the data type indicates the property is a rich text record, and wherein the additional functions support embedding of a rich text record in the instance of the live application.

9. The method of claim 1, wherein the data type indicates the property is an image in the cloud collaboration platform, and wherein the additional functions support embedding of an image in the instance of the live application.

10. A system, comprising:

a memory; and at least one processor coupled to the memory and configured to:

provide data storage and a data model application programming interface to a live application in a cloud collaboration platform;

initialize a record in an instance of the live application running in a document in the cloud collaboration platform, wherein the record comprises one or more properties, wherein a property in the one or more properties is a key-value pair comprising a key and a value, and wherein the property is associated with a data type and the cloud collaboration platform extends additional functions to the live application based on the data type;

receive a changed value and the key from the instance of the live application;

update the value in the key-value pair corresponding to the key to reflect the changed value; and store the updated key-value pair in the data storage in association with the instance of the live application.

11. The system of claim 10, the at least one processor further configured to:

receive a request key and a get request from an instance of the live application;

retrieve the value from the data storage, wherein the key associated with the value via the key-value pair matches the request key; and provide the value to the instance of the live application.

12. The system of claim 10, wherein the value is a second record.

13. The system of claim 10, wherein the value is a list of records.

14. The system of claim 10, the at least one processor further configured to:

provide offline functions to a device accessing the cloud collaboration platform to allow the device to create a local cache of the data storage to allow the live application to continue to function when the device is offline.

15. The system of claim 10, wherein the data type indicates the property is a binary file, and wherein the additional functions support embedding of a binary file in the instance of the live application.

16. A non-transitory computer-readable device having instructions stored thereon that, when executed by at least one computing device, causes the at least one computing device to perform operations comprising:

providing data storage and a data model application programming interface to a live application in a cloud collaboration platform;

initializing a record in an instance of the live application running in a document in the cloud collaboration platform, wherein the record comprises one or more properties, wherein a property in the one or more properties is a key-value pair comprising a key and a value, and wherein the property is associated with a data type and the cloud collaboration platform extends additional functions to the live application based on the data type;

receiving a changed value and the key from the instance of the live application;

updating the value in the key-value pair corresponding to the key to reflect the changed value; and storing the updated key-value pair in the data storage in association with the instance of the live application.

17. The non-transitory computer-readable device of claim 16, the operations further comprising:

receiving a request key and a get request from an instance of the live application;

retrieving the value from the data storage, wherein the key associated with the value via the key-value pair matches the request key; and providing the value to the instance of the live application.

18. The non-transitory computer-readable device of claim 16, wherein the value is a second record.

19. The non-transitory computer-readable device of claim 16, wherein the value is a list of records.

20. The non-transitory computer-readable device of claim 16, the operations further comprising:

providing offline functions to a device accessing the cloud collaboration platform to allow the device to create a local cache of the data storage to allow the live application to continue to function when the device is offline.

* * * * *